United States Patent [19]
Nielsen

[11] Patent Number: 6,002,771
[45] Date of Patent: *Dec. 14, 1999

[54] METHOD AND SYSTEM FOR REGULATING DISCOUNTS ON MERCHANDISE DISTRIBUTED THROUGH NETWORKED COMPUTER SYSTEMS

[75] Inventor: Jakob Nielsen, Atherton, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/651,596

[22] Filed: May 22, 1996

[51] Int. Cl.$^6$ ........................................................ H04L 9/00
[52] U.S. Cl. .............................. 380/49; 380/23; 380/30; 380/51; 705/14
[58] Field of Search ................. 380/23, 30, 51, 380/49; 705/14, 23; 235/303

[56] References Cited

U.S. PATENT DOCUMENTS

| | | | |
|---|---|---|---|
| 4,670,853 | 6/1987 | Stepien | 360/705.01 |
| 4,723,212 | 2/1988 | Mindrum et al. | 705/14 |
| 4,910,672 | 3/1990 | Off et al. | 705/14 |
| 4,974,878 | 12/1990 | Josephson | 283/67 |
| 5,109,153 | 4/1992 | Johnson et al. | 235/468 |
| 5,173,851 | 12/1992 | Off et al. | 705/14 |
| 5,176,224 | 1/1993 | Spector | 235/383 X |
| 5,380,991 | 1/1995 | Valencia et al. | 235/383 |
| 5,388,211 | 2/1995 | Hornbuckle | . |
| 5,500,681 | 3/1996 | Jones | 348/473 |
| 5,504,519 | 4/1996 | Remillard | 348/7 |
| 5,602,918 | 2/1997 | Chen et al. | 380/21 |
| 5,612,868 | 3/1997 | Off et al. | 705/14 |
| 5,710,886 | 1/1998 | Christensen et al. | 705/14 |
| 5,761,648 | 6/1998 | Golden et al. | 705/14 |

FOREIGN PATENT DOCUMENTS

| | | |
|---|---|---|
| 0 568 088 | 3/1993 | European Pat. Off. . |
| 0 679 980 | 11/1995 | European Pat. Off. . |
| 0 822 535 | 2/1998 | European Pat. Off. . |
| 95 21428 | 8/1995 | WIPO . |
| 96 39668 | 12/1996 | WIPO . |

*Primary Examiner*—Richard Chilcot
*Assistant Examiner*—Paul D. Amrozowicz
*Attorney, Agent, or Firm*—McDermott, Will & Emery

[57] ABSTRACT

The present invention provides a method and system for regulating discounts on merchandise distributed through networked computer systems. The method and system involve the use of discount coupons valid toward the repurchase of the merchandise. These discount coupons include mechanisms for verifying the validity of the coupons. A system in which the present invention operates includes a vendor computer system and a user computer system connected via a network. The vendor and user computer systems each include a computer connected to a display device, a keyboard, and a secondary storage device. A vendor discount regulator and a user discount regulator are stored in the vendor/user secondary storage devices for execution by the vendor/user computers. In operation, when a user desires to purchase merchandise, the user creates a request to purchase the merchandise and sends the request to purchase to a vendor. The vendor creates and encrypts a discount coupon valid toward the repurchase of the merchandise at a later time and sends the encrypted discount coupon together with the merchandise to the user. The user decrypts the discount coupon and stores the discount coupon in the user computer system. Later, when the user desires to repurchase the merchandise, the user creates a request to repurchase the merchandise and sends the request to repurchase to the vendor. The vendor decrypts the request to repurchase and verifies certain information regarding the purchase and the repurchase of the merchandise. After verifying the information, the vendor sends the merchandise to the user.

29 Claims, 10 Drawing Sheets

METHOD AND SYSTEM FOR REGULATING DISCOUNTS ON MERCHANDISE DISTRIBUTED THROUGH NETWORKED COMPUTER SYSTEMS

FIELD OF THE INVENTION

The present invention relates generally to networked computer systems and, more particularly, to a method and system for regulating discounts on merchandise distributed through networked computer systems.

BACKGROUND OF THE INVENTION

Merchandise is commonly distributed through networked computer systems. For example, a user can purchase a copy of or access to an article, a magazine, a book, a film, a sound recording, a software product, or a database through a networked computer system. These types of merchandise are sometimes referred to as intellectual property because their value is in the content of the merchandise as opposed to the physical merchandise itself.

After purchasing and using merchandise, the user may not wish to keep a copy of the merchandise on the user's computer system. If the merchandise requires a relatively small amount of storage space (e.g., an article), the user may not mind keeping a copy of the merchandise on the user's computer system. If the merchandise requires a relatively large amount of storage space (e.g., a film or a software product), the user may not wish to keep a copy of the merchandise on the user's computer system.

The user may wish, however, to later use the same merchandise. If the user is forced to repurchase the merchandise at its full price in order to reuse the merchandise, the user may decide to keep a copy of the merchandise on the user's computer system after the original purchase (even though the user does not wish to do so). If the user could repurchase the merchandise at a reduced price, the user may decide to not keep a copy of the merchandise on the user's computer system and to later repurchase the merchandise when the user desires to reuse it.

As a result, a system which allows users to repurchase merchandise at a reduced price is desirable to the user. Such a system is also desirable to the vendor. One reason why such a system is desirable to the vendor is that it encourages users to repurchase merchandise instead of keeping a copy of the merchandise on the user's computer system. If the user does not keep a copy of the merchandise, there is less chance that the merchandise will be copied by third parties (which would result in a total loss of revenue for the vendor). Another reason why such a system is desirable to the vendor is that the vendor receives additional revenue from the resale of the merchandise to the user.

Even though such a system is desirable to the vendor, there must be an efficient method for regulating the repurchase in order to make the system feasible for the vendor. One possible solution is for the vendor to maintain a database including information regarding each purchase of merchandise, such as the name of the purchaser and the merchandise that was purchased. For privacy reasons, this solution is not desirable. Therefore, a need exists for a method and system for regulating discounts on merchandise distributed through networked computer systems.

SUMMARY OF THE INVENTION

The preferred embodiment of the present invention provides a method and system for regulating discounts on merchandise distributed through networked computer systems. The method and system involve the use of discount coupons valid toward the repurchase of the merchandise. These discount coupons include mechanisms for verifying the validity of the coupons.

A system in which the preferred embodiment of the present invention operates includes a vendor computer system and a user computer system connected to one another via a network. The vendor computer system includes a computer connected to a display device, a keyboard, and a secondary storage device. A vendor discount regulator is stored in the vendor secondary storage device for execution by the vendor computer. Similarly, the user computer system includes a computer connected to a display device, a keyboard, and a secondary storage device. A user discount regulator is stored in the user secondary storage device for execution by the user computer.

In operation, when a user desires to purchase merchandise, the user creates a request to purchase the merchandise and sends the request to purchase to a vendor. The vendor creates and encrypts a discount coupon valid toward the repurchase of the merchandise at a later time and sends the encrypted discount coupon together with the merchandise to the user. The user decrypts the discount coupon and stores the discount coupon in the user computer system.

Later, when the user desires to repurchase the merchandise, the user creates a request to repurchase the merchandise and sends the request to repurchase to the vendor. The vendor decrypts the request to repurchase and verifies certain information regarding the purchase and the repurchase of the merchandise. After verifying the information, the vendor sends the merchandise to the user.

DETAILED DESCRIPTION OF THE PREFERRED EMBODIMENT

The preferred embodiment of the present invention provides a method and system for regulating discounts on merchandise distributed through networked computer systems. The method and system involve the use of discount coupons valid toward the repurchase of the merchandise. These discount coupons include mechanisms for verifying the validity of the coupons.

Figure 1:
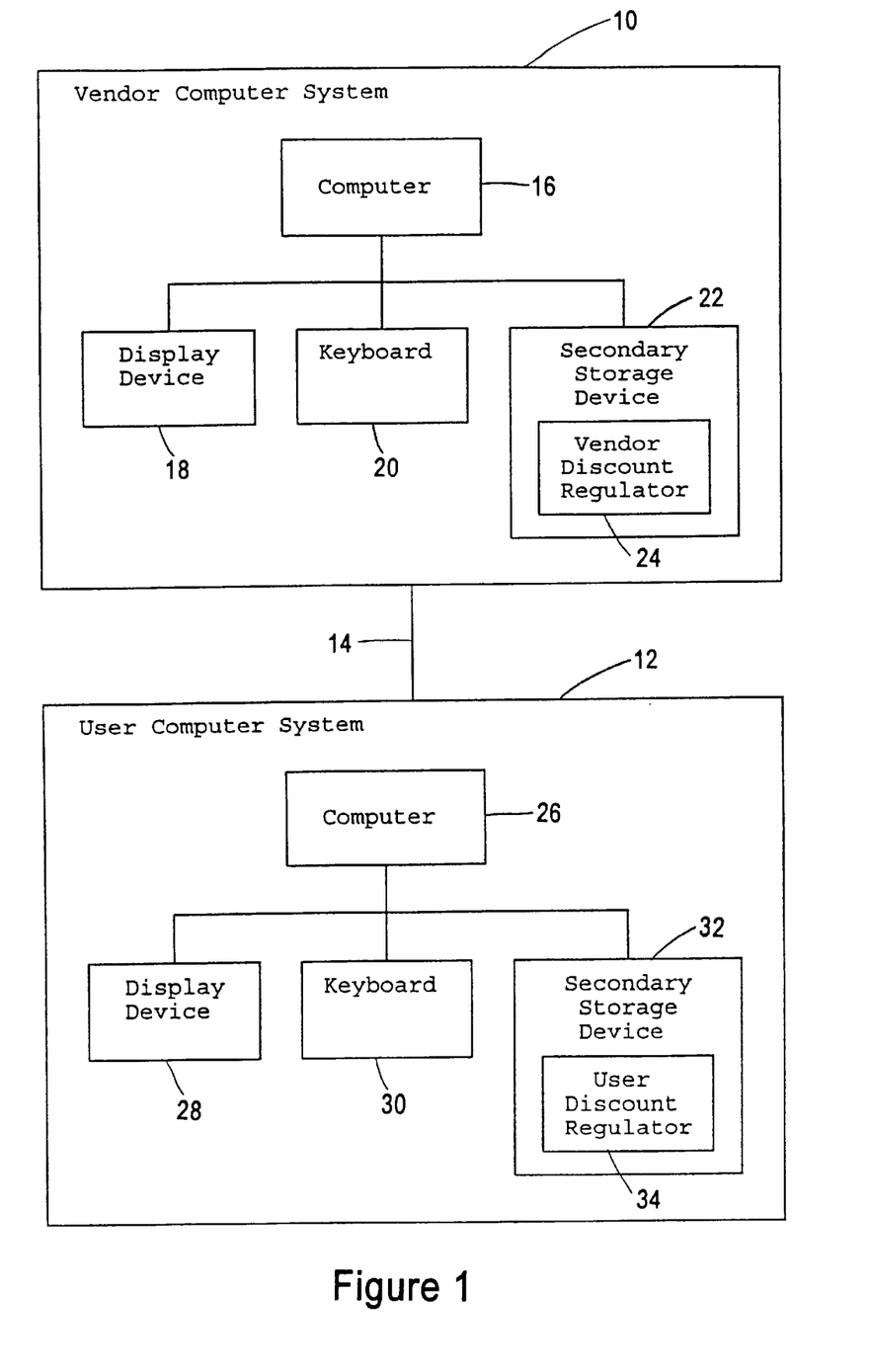
FIG. 1 is a block diagram illustrating the components of a system in which the preferred embodiment of the present invention operates.

A system in which the preferred embodiment of the present invention operates is illustrated in FIG. 1. The system includes a vendor computer system 10 and a user computer system 12. The vendor computer system 10 and the user computer system 12 are connected to one another via a network 14.

The vendor computer system 10 includes a computer 16 for controlling the operation of the vendor computer system. The computer 16 typically includes a central processing unit and a primary storage device (not separately shown). The computer 16 is connected to a display device 18, a keyboard 20, and a secondary storage device 22. The secondary storage device 22 may be any of various well-known secondary storage devices, such as a CD-ROM, a diskette, or a hard disk. A vendor discount regulator 24 is stored in the secondary storage device 22 for execution by the computer 16.

Similarly, the user computer system 12 includes a computer 26 for controlling the operation of the user computer system. The computer 26 typically includes a central processing unit and a primary storage device (not separately shown). The computer 26 is connected to a display device 28, a keyboard 30, and a secondary storage device 32. The secondary storage device 32 may be any of various well-known secondary storage devices, such as a CD-ROM, a diskette, or a hard disk. A user discount regulator 34 is stored in the secondary storage device 32 for execution by the computer 26.

For the sake of simplicity, the vendor computer system 10 and the user computer system 12 of the present invention have each been illustrated with a single computer (16, 26), a single display device (18, 28), a single keyboard (20, 30), and a single secondary storage device (22, 32). However, one of ordinary skill in the art will appreciate that the vendor computer system 10 and/or the user computer system 12 could include any number of computers and other components (and typically, would include a multiple number of computers and other components). These computers and other components would be connected to one another either directly or via the network 14.

Further, the vendor computer system 10 and/or the user computer system 12 could include components other than those separately shown. For example, the vendor computer system 10 and/or the user computer system 12 could include a variety of input/output ("I/O") devices (other than the display device (18, 28), the keyboard (20, 30), and the secondary storage device (22, 32) separately shown). These components of computer systems are well-known in the art and will not be discussed in greater detail.

Figure 2:
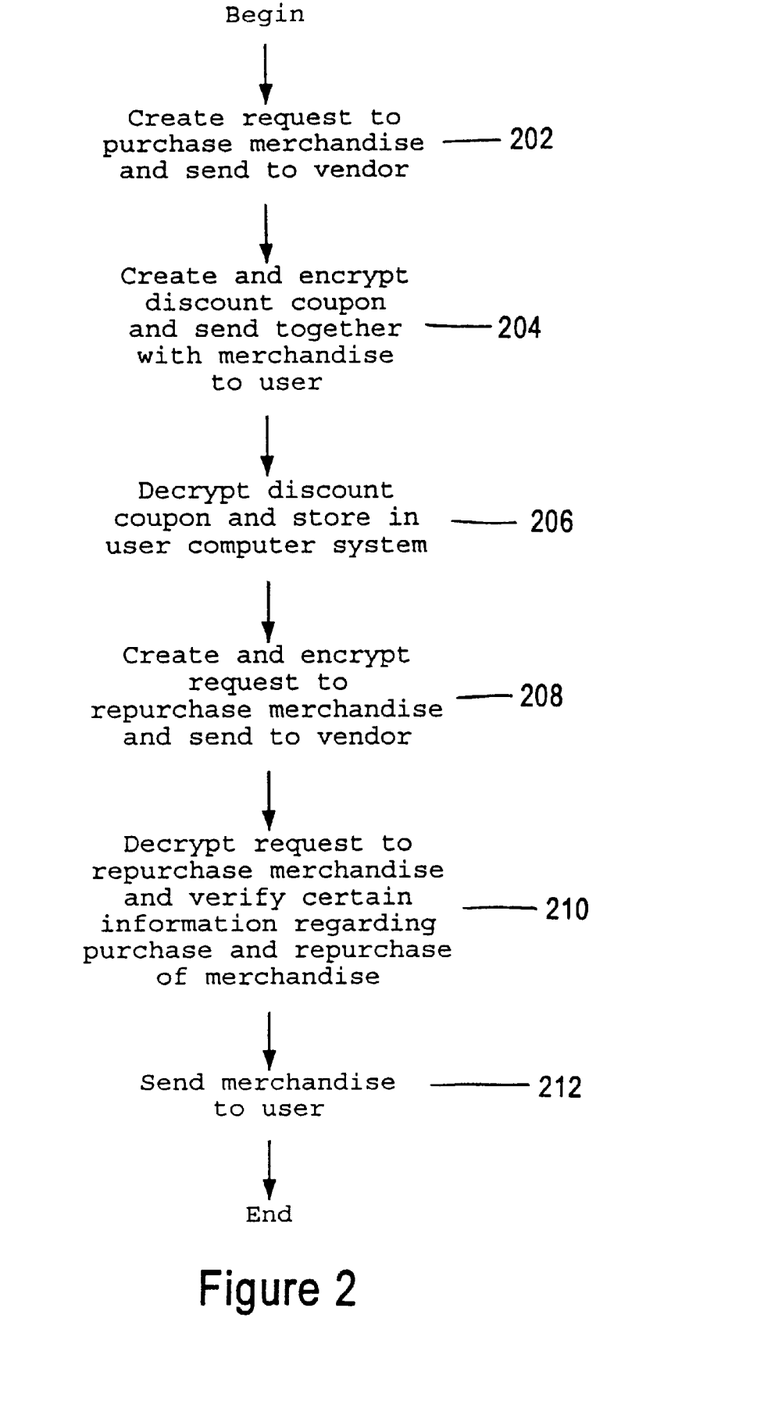
FIG. 2 is a flowchart generally illustrating the preferred steps performed in the operation of the system of FIG. 1.

FIG. 2 generally illustrates the preferred steps performed in the operation of the system of the present invention. Initially, when a user desires to purchase merchandise, the user creates a request to purchase the merchandise and sends the request to purchase to a vendor (step 202). The vendor creates and encrypts a discount coupon valid toward the repurchase of the merchandise at a later time and sends the encrypted discount coupon together with the merchandise to the user (step 204). The user decrypts the discount coupon and stores the discount coupon in the user computer system (step 206).

Later, when the user desires to repurchase the merchandise, the user creates and encrypts a request to repurchase the merchandise and sends the request to repurchase to the vendor (step 208). The vendor decrypts the request to repurchase and verifies certain information regarding the purchase and the repurchase of the merchandise (step 210). After verifying the information, the vendor sends the merchandise to the user (step 212).

In discussing the preferred steps performed in the operation of the system of the present invention, the vendor and the user are referred to as performing certain steps. However, one of ordinary skill in the art will appreciate that the steps referred to as being performed by the vendor could be performed by the vendor discount regulator 24 and the steps referred to as being performed by the user could be performed by the user discount regulator 34. Therefore, all references to the vendor throughout this specification shall be understood as including a reference to either the vendor or the vendor discount regulator 24, and all references to the vendor performing certain steps shall be understood as including a reference to either the vendor or the vendor discount regulator 24 performing the steps. Similarly, all references to the user throughout this specification shall be understood as including a reference to either the user or the user discount regulator 34, and all references to the user performing certain steps shall be understood as including a reference to either the user or the user discount regulator 34 performing the steps.

As discussed above, the method and system of the present invention involve the encryption and decryption of certain information. In the preferred embodiment of the present invention, two types of encryption systems are used. These encryption systems are: (1) a secret-key system, and (2) a public-key system. With a secret-key system, a single key is used for both encrypting and decrypting information. A secret-key system is sometimes referred to as a private-key, a symmetric-key, or a single-key system. With a public-key system, two different keys are used for encrypting and decrypting information. In this system, one key is public and the other key is private. Information that is encrypted with one key can be decrypted with the other key. A public-key system is sometimes referred to as an asymmetric-key or a two-key system. As used herein, secret-key refers to the single key in a secret-key system and public-key and private-key refer to the two keys in a public-key system.

In the preferred embodiment of the present invention, one secret-key system and two public-key systems are used. The secret-key system is used by the vendor to encrypt certain information so that no one but the vendor can understand it. The key in this system will be referred to as a vendor secret-key. The public-key systems are used by the vendor and the user to encrypt certain information so that each party can understand and verify information sent to it by the other party but no third party can understand it. In one public-key system, the vendor selects and is the owner of the keys and in the other public-key system, the user selects and is the owner of the keys. Both the vendor and the user make one key public and keep the other key private. The keys in the first system (where the vendor selects the keys) will be referred to as a vendor public-key/vendor private-key and the keys in the second system (where the user selects the keys) will be referred to as a user public-key/user private-key. In the preferred embodiment of the present invention, the public-key systems are based on the well-known RSA algorithm. A discussion of the RSA algorithm is found in U.S. Pat. No. 4,405,829 to Rivest et al. However, one of ordinary skill in the art will appreciate that other public-key systems could be used.

Using the public-key systems, one party (e.g., the vendor) can encrypt information using the other party's (e.g., the user's) public-key and only the other party (e.g., the user) can decrypt the information using that party's (e.g., the user's) private-key. In this situation, the secrecy of the information is ensured because only the other party (e.g., the user) should be able to decrypt information that was encrypted using that party's (e.g., the user's) public-key.

Alternatively, one party (e.g., the user) can encrypt information using that party's (e.g., the user's) private-key and the other party (e.g., the vendor) can decrypt the information using the first party's (e.g., the user's) public-key. In this situation, the source of the information is ensured because only the first party (e.g., the user) should be able to encrypt information that can be decrypted using that party's (e.g., the user's) public-key.

Additionally, information can be encrypted more than once using a combination of keys to ensure both the secrecy and the source of the information. For example, one party (e.g., the user) can encrypt information using that party's (e.g., the user's) private-key and then encrypt the information using the other party's (e.g., the vendor's) public-key. The other party (e.g., the vendor) can decrypt the information using that party's (e.g., the vendor's) private-key and then decrypt the information using the first party's (e.g., the user's) public-key. In this situation, the secrecy of the information is ensured by the second encryption and the source of the information is ensured by the first encryption. Although this discussion has stated that the secrecy and the source of the information are ensured through the above steps, encryption schemes are not completely secure. The security of encryption schemes can be compromised if the secret-key (in a secret-key system) or the private-key (in a public-key system) becomes known to a party other than the owner of the key.

Figure 3:
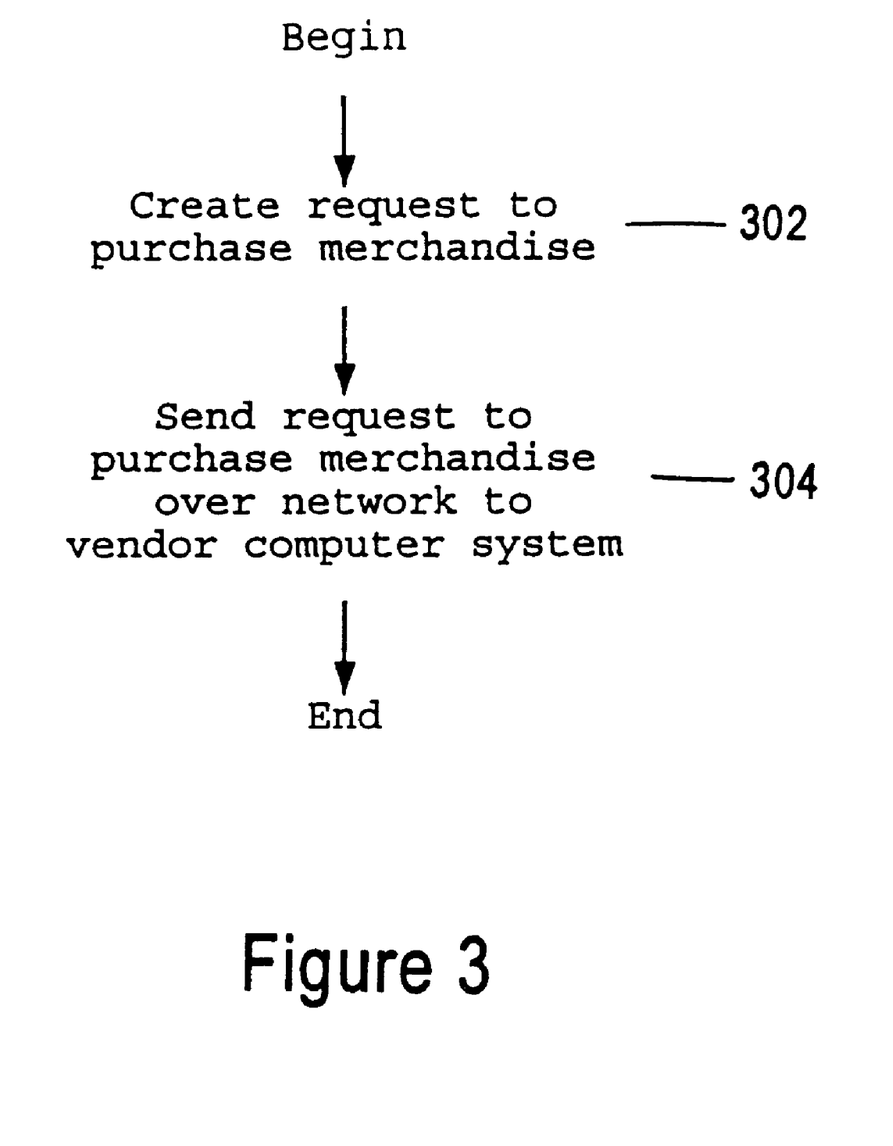
FIG. 3 is a flowchart illustrating in greater detail the preferred step of creating and sending a request to purchase merchandise to a vendor, as generally illustrated in FIG. 2.

FIG. 3 illustrates the preferred step of creating the request to purchase the merchandise and sending the request to purchase to the vendor (step 202) in greater detail. When the user desires to purchase the merchandise from the vendor, the user creates the request to purchase the merchandise (step 302). In a preferred embodiment of the present invention, the request to purchase includes fields for all of the information required by the vendor to complete the purchase. For example, the request to purchase may include: (1) the user's name, (2) a description of the merchandise that the user desires to purchase, (3) the computer address from which the request to purchase will be sent (and to which the merchandise will be sent), (4) a form of payment, and (5) a user public-key. After creating the request to purchase the merchandise, the user sends the request to purchase over the network from the user computer system to the vendor computer system (step 304).

Figure 4:
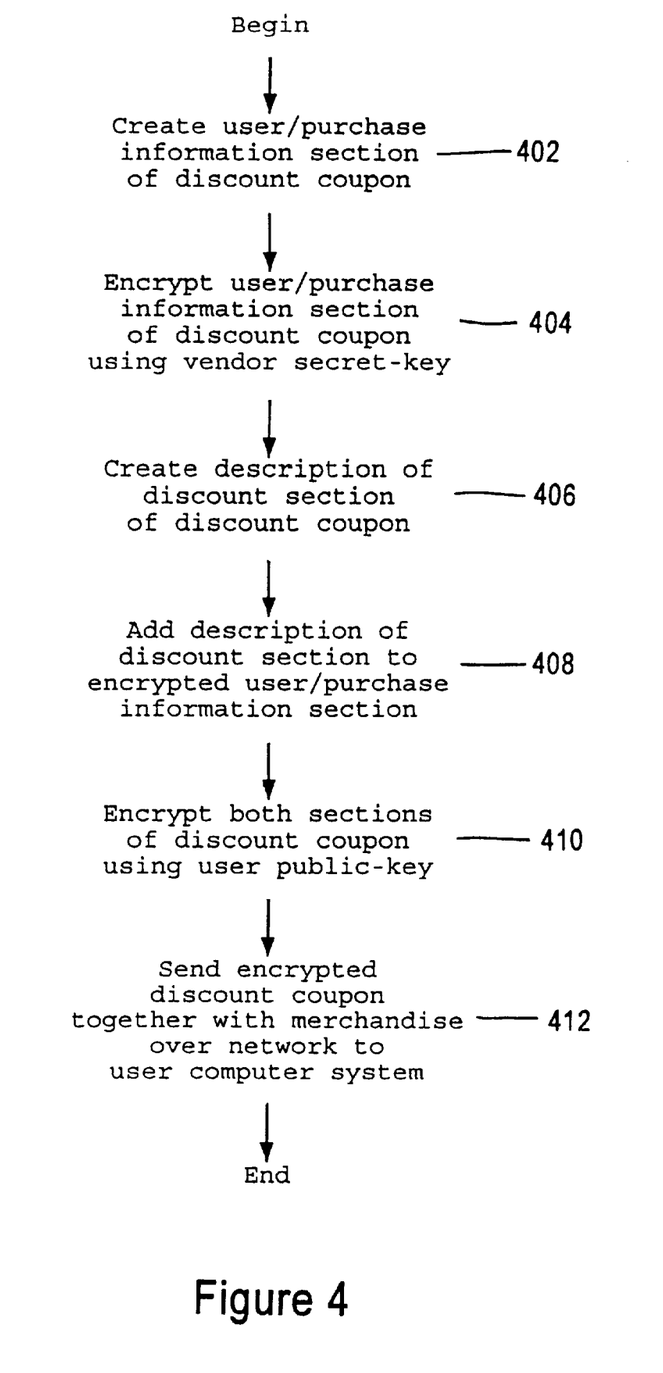
FIG. 4 is a flowchart illustrating in greater detail the preferred step of creating, encrypting, and sending a discount coupon to a user, as generally illustrated in FIG. 2.
Figure 5:
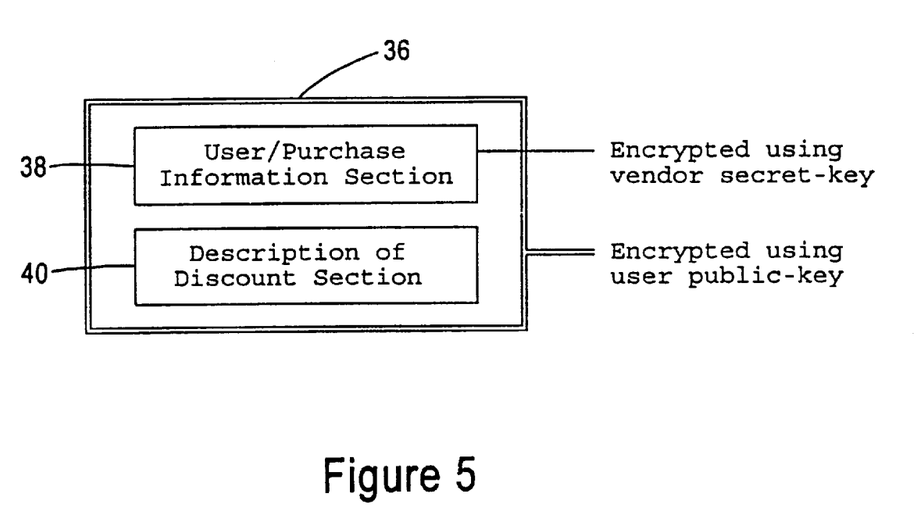
FIG. 5 is a diagram illustrating the sections of the discount coupon and how each section is encrypted.

FIG. 4 illustrates the preferred step of creating and encrypting the discount coupon and sending the encrypted discount coupon together with the merchandise to the user (step 204) in greater detail. FIG. 5 illustrates the sections of the discount coupon and how each section is encrypted. After receiving the request to purchase the merchandise from the user, the vendor creates and encrypts the discount coupon 36 valid toward the repurchase of the merchandise at a later time (steps 402–410). In a preferred embodiment of the present invention, the discount coupon 36 includes a section with user/purchase information 38 and a section with a description of the discount 40. The user/purchase information section 38 includes fields for all of the information required by the vendor to later verify the validity of the discount coupon. For example, this section may include: (1) a description of the merchandise that is being purchased, (2) the computer address from which the request to purchase was sent (and to which the merchandise will be sent), and (3) the user public-key. This section may also include a purchase date if the discount coupon is only valid for a certain period of time after the original purchase.

Initially, the vendor creates the user/purchase information section 38 of the discount coupon 36 (step 402) and encrypts this section using a vendor secret-key (step 404). Next, the vendor creates the description of the discount section 40 of the discount coupon 36 (step 406) and adds this section to the encrypted user/purchase information section 38 (step 408). The vendor then encrypts both sections of the discount coupon 36 using the user public-key (step 410). Lastly, the vendor sends the encrypted discount coupon 36 together with the merchandise over the network from the vendor computer system to the user computer system (step 412).

Figure 6:
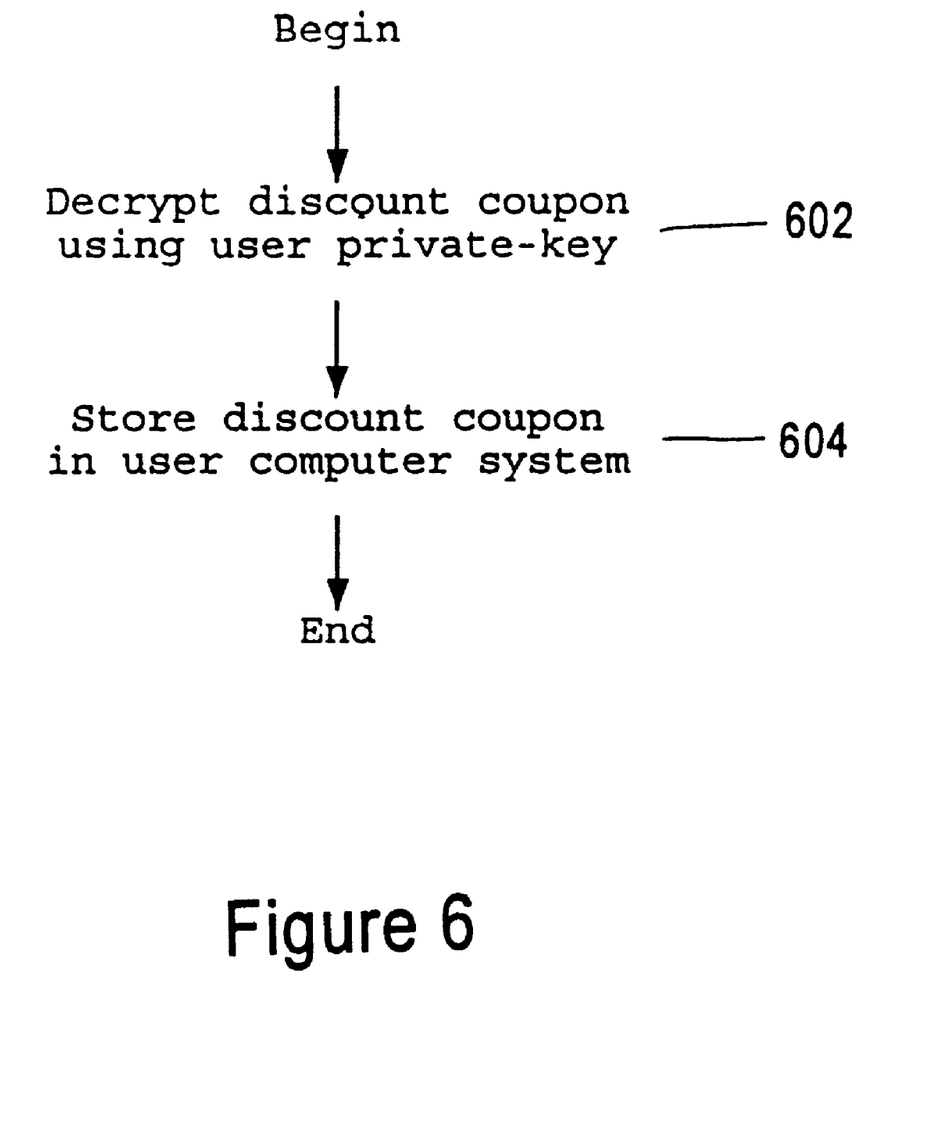
FIG. 6 is a flowchart illustrating in greater detail the preferred step of decrypting and storing the discount coupon, as generally illustrated in FIG. 2.

FIG. 6 illustrates the preferred step of decrypting the discount coupon and storing the discount coupon in the user computer system (step 206) in greater detail. After receiving the encrypted discount coupon 36 from the vendor, the user decrypts the discount coupon 36 using the user private-key (step 602). The user then stores the discount coupon 36 in the user computer system (step 604). The discount coupon 36 actually includes the encrypted user/purchase information section 38 and the decrypted description of the discount section 40. The user/purchase information section 38 is still encrypted because it was encrypted twice and only decrypted once.

Figure 7:
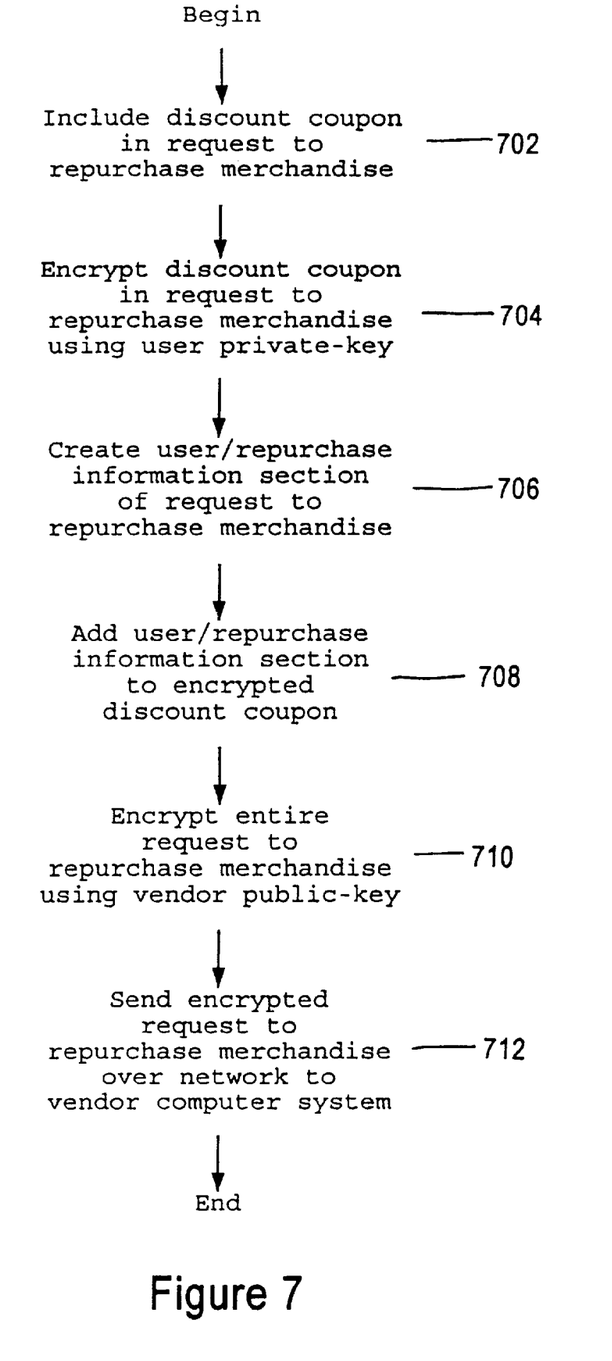
FIG. 7 is a flowchart illustrating in greater detail the preferred step of creating, encrypting, and sending a request to repurchase merchandise to the vendor, as generally illustrated in FIG. 2.
Figure 8:
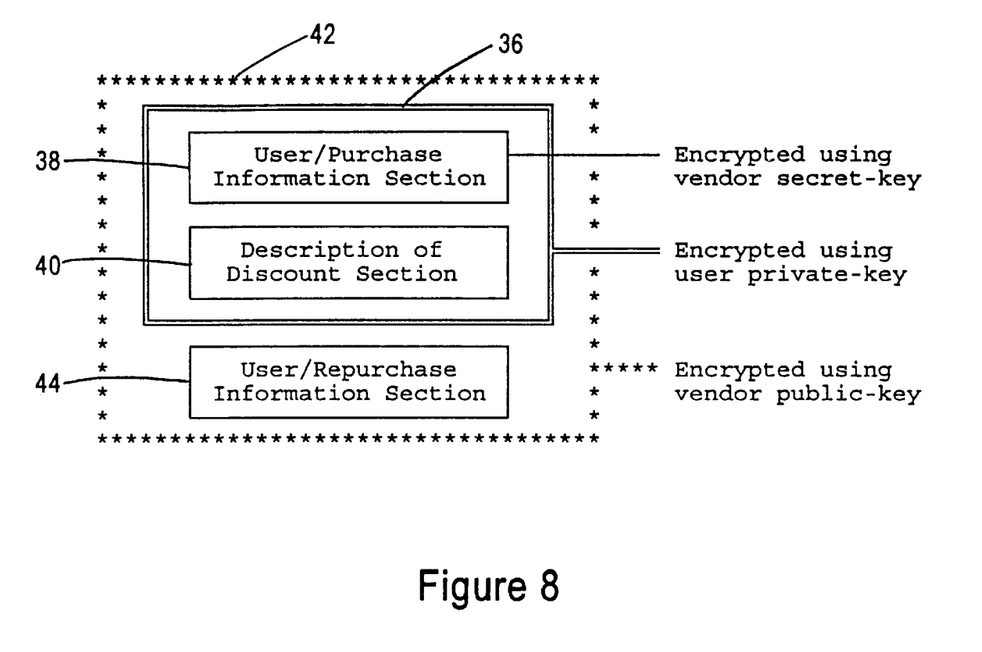
FIG. 8 is a diagram illustrating the sections of the request to repurchase merchandise and how each section is encrypted.

FIG. 7 illustrates the preferred step of creating and encrypting the request to repurchase the merchandise and sending the request to repurchase to the vendor (step 208) in greater detail. FIG. 8 illustrates the sections of the request to repurchase and how each section is encrypted. When the user desires to repurchase the merchandise from the vendor, the user creates and encrypts the request to repurchase the merchandise 42 (steps 702–710). In a preferred embodiment of the present invention, the request to repurchase 42 includes the discount coupon 36 and a section with user/repurchase information 44. The user/repurchase information section 44 includes fields for all of the information required by the vendor to complete the repurchase. For example, this section may include: (1) the user's name, (2) a description of the merchandise that the user desires to repurchase, (3) the computer address from which the request to repurchase will be sent (and to which the merchandise will be sent), (4) a form of payment, and (5) the user public-key.

Initially, the user includes the discount coupon 36 (including the encrypted user/purchase information section 38 and the decrypted description of the discount section 40) in the request to repurchase 42 (step 702) and encrypts the discount coupon using the user private-key (step 704). Next, the user creates the user/repurchase information section 44 of the request to repurchase 42 (step 706) and adds this section to the encrypted discount coupon 36 (step 708). The user then encrypts the entire request to repurchase 42 using the vendor public-key (step 710). Lastly, the user sends the encrypted request to repurchase 42 (including the discount coupon 36 and the user/repurchase information section 44) over the network from the user computer system to the vendor computer system (step 712).

Figure 9A:
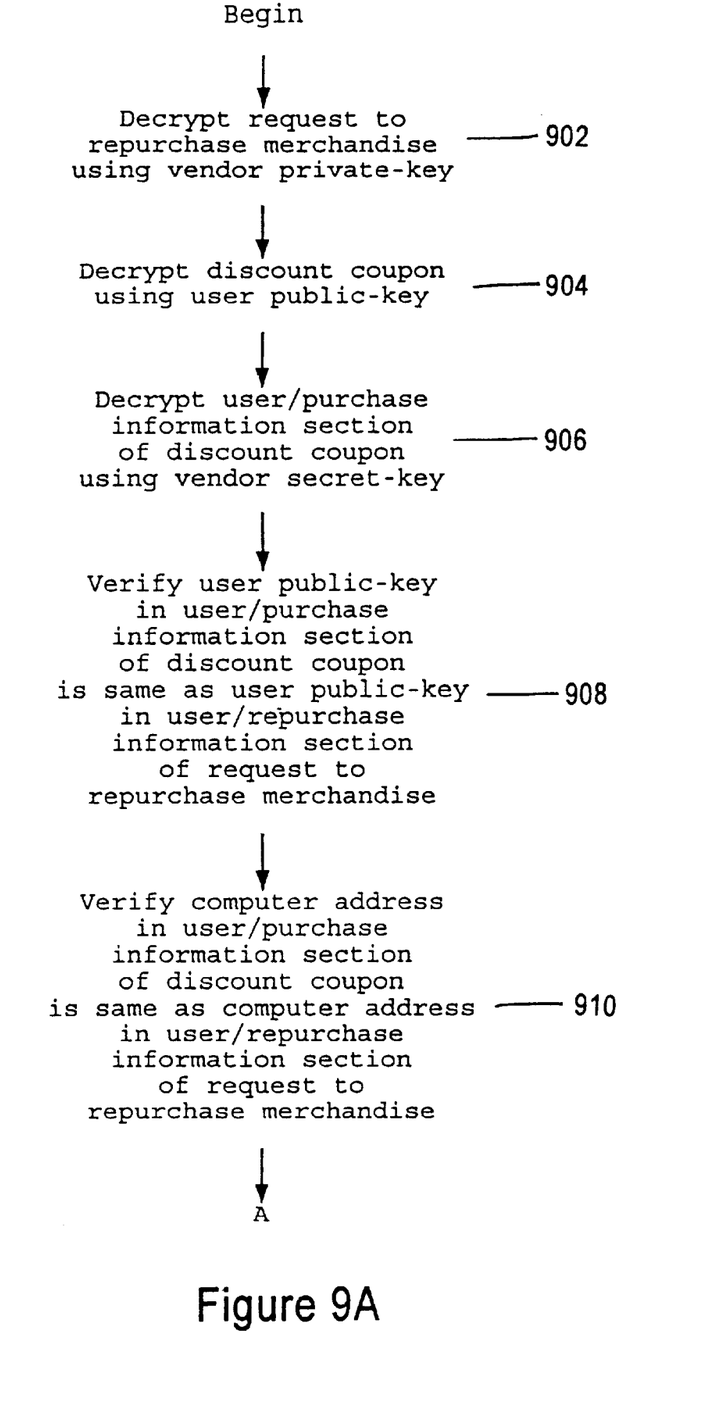
FIGS. 9A and 9B collectively are a flowchart illustrating in greater detail the preferred step of decrypting and verifying the request to repurchase merchandise, as generally illustrated in FIG. 2.
Figure 9B:
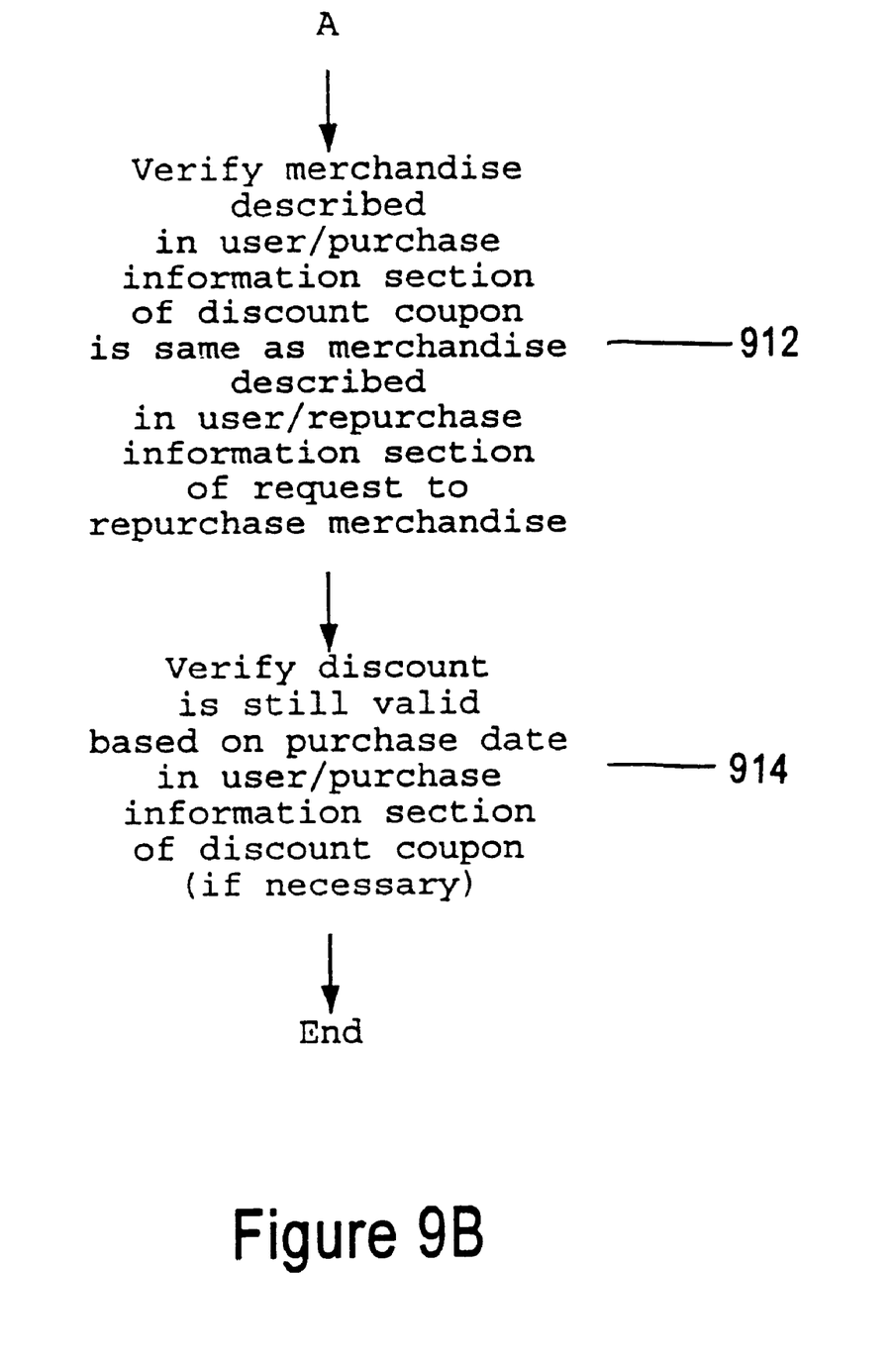

FIGS. 9A and 9B collectively illustrate the preferred step of decrypting the request to repurchase 42 and verifying certain information regarding the purchase and the repurchase of the merchandise (step 210) in greater detail. After receiving the request to repurchase the merchandise 42 from the user, the vendor decrypts the request to repurchase (steps 902–906). Initially, the vendor decrypts the request to repurchase 42 (including the discount coupon 36 and the user/repurchase information section 44) using the vendor private-key (step 902). The vendor then decrypts the discount coupon 36 (including the user/purchase information section 38 and the description of the discount section 40) using the user public-key (step 904). Next, the vendor decrypts the user/purchase information section 38 of the discount coupon 36 using the vendor secret-key (step 906).

Lastly, the vendor verifies certain information regarding the purchase and the repurchase of the merchandise (steps 908–914). More specifically, the vendor verifies that: (1) the user public-key in the user/purchase information section 38 of the discount coupon 36 is the same as the user public-key in the user/repurchase information section 44 of the request to repurchase 42 (step 908), (2) the computer address in the user/purchase information section 38 of the discount coupon 36 is the same as the computer address in the user/repurchase information section 44 of the request to repurchase 42 (step 910), (3) the merchandise described in the user/purchase information section 38 of the discount coupon 36 is the same as the merchandise described in the user/repurchase information section 44 of the request to repurchase 42 (step 912), and (4) the discount is still valid based on the purchase date in the user/purchase information section 38 of the discount coupon 36 (if the discount coupon is only valid for a certain period of time after the original purchase) (step 914).

One of ordinary skill in the art will now appreciate that the preferred embodiment of the present invention provides a method and system for regulating discounts on merchandise distributed through networked computer systems. The method and system involve the use of discount coupons valid toward the repurchase of the merchandise. These discount coupons include mechanisms for verifying the validity of the coupons.

Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A method executed in a computer system for regulating discounts on merchandise distributed through networked computer systems, the method comprising the steps of:
    when a user purchases merchandise, creating a discount coupon valid toward the repurchase of the merchandise, the discount coupon including information regarding the user and the purchase of the merchandise;
    encrypting the discount coupon; and
    sending the encrypted discount coupon to the user.
2. The method of claim 1, further including the steps of:
    when the user desires to repurchase the merchandise, creating a request to repurchase the merchandise, the request to repurchase including the encrypted discount coupon and information regarding the user and the repurchase of the merchandise; and
    sending the request to repurchase to the vendor.
3. The method of claim 2, further including the steps of:
    decrypting the discount coupon in the request to repurchase; and
    verifying information regarding the purchase and the repurchase of the merchandise.
4. The method of claim 1,
    wherein the step of creating the discount coupon includes the steps of:
        creating a user/purchase information section of the discount coupon, and
        creating a description of the discount section of the discount coupon; and
    wherein the step of encrypting the discount coupon includes the steps of:
        encrypting the user/purchase information section of the discount coupon, and
        encrypting the encrypted user/purchase information section of the discount coupon and the description of the discount section of the discount coupon.
5. The method of claim 4, further including the step of:
    decrypting the discount coupon so that the discount coupon includes the encrypted user/purchase information section of the discount coupon and the decrypted description of the discount section of the discount coupon.
6. The method of claim 5, further including the steps of:
    when the user desires to repurchase the merchandise, including the discount coupon in a request to repurchase the merchandise, the discount coupon including the encrypted user/purchase information section of the discount coupon and the decrypted description of the discount section of the discount coupon;
    creating a user/repurchase information section of the request to repurchase;
    encrypting the discount coupon in the request to repurchase;
    encrypting the encrypted discount coupon in the request to repurchase and the user/repurchase information section of the request to repurchase; and
    sending the encrypted request to repurchase to the vendor.
7. The method of claim 6, further including the steps of:
    decrypting the request to repurchase;
    decrypting the discount coupon in the request to repurchase;
    decrypting the user/purchase information section of the discount coupon; and
    verifying information in the user/purchase information section of the discount coupon regarding the purchase of the merchandise and information in the user/repurchase information section of the request to repurchase regarding the repurchase of the merchandise.
8. The method of claim 1,
    wherein the step of creating the discount coupon includes the steps of:
        creating a user/purchase information section of the discount coupon, and
        creating a description of the discount section of the discount coupon; and
    wherein the step of encrypting the discount coupon includes the steps of:
        encrypting the user/purchase information section of the discount coupon using a vendor secret-key, and
        encrypting the encrypted user/purchase information section of the discount coupon and the description of the discount section of the discount coupon using a user public-key.
9. The method of claim 8, further including the step of:
    decrypting the discount coupon using a user private-key so that the discount coupon includes the encrypted user/purchase information section of the discount coupon and the decrypted description of the discount section of the discount coupon.

10. The method of claim 9, further including the steps of:
when the user desires to repurchase the merchandise, including the discount coupon in a request to repurchase the merchandise, the discount coupon including the encrypted user/purchase information section of the discount coupon and the decrypted description of the discount section of the discount coupon;
creating a user/repurchase information section of the request to repurchase;
encrypting the discount coupon in the request to repurchase using the user private-key;
encrypting the encrypted discount coupon in the request to repurchase and the user/repurchase information section of the request to repurchase using a vendor public-key; and
sending the encrypted request to repurchase to the vendor.

11. The method of claim 10, further including the steps of:
decrypting the request to repurchase using a vendor private-key;
decrypting the discount coupon in the request to repurchase using the user public-key;
decrypting the user/purchase information section of the discount coupon using the vendor secret-key; and
verifying information in the user/purchase information section of the discount coupon regarding the purchase of the merchandise and information in the user/repurchase information section of the request to repurchase regarding the repurchase of the merchandise.

12. A computer program product for regulating discounts on merchandise distributed through networked computer systems, the computer program product comprising:
computer readable program code configured to, when a user purchases merchandise, create a discount coupon valid toward the repurchase of the merchandise, the discount coupon including information regarding the user and the purchase of the merchandise;
computer readable program code configured to encrypt the discount coupon; and
a computer readable medium in which the computer readable program codes are stored.

13. The computer program product of claim 12, further including:
computer readable program code configured to, when the user desires to repurchase the merchandise, create a request to repurchase the merchandise, the request to repurchase including the encrypted discount coupon and information regarding the user and the repurchase of the merchandise.

14. The computer program product of claim 13, further including:
computer readable program code configured to decrypt the discount coupon in the request to repurchase; and
computer readable program code configured to verify information regarding the purchase and the repurchase of the merchandise.

15. The computer program product of claim 12,
wherein the computer readable program code configured to create the discount coupon includes:
computer readable program code configured to create a user/purchase information section of the discount coupon, and
computer readable program code configured to create a description of the discount section of the discount coupon; and
wherein the computer readable program code configured to encrypt the discount coupon includes:
computer readable program code configured to encrypt the user/purchase information section of the discount coupon, and
computer readable program code configured to encrypt the encrypted user/purchase information section of the discount coupon and the description of the discount section of the discount coupon.

16. The computer program product of claim 15, further including:
computer readable program code configured to decrypt the discount coupon so that the discount coupon includes the encrypted user/purchase information section of the discount coupon and the decrypted description of the discount section of the discount coupon.

17. The computer program product of claim 16, further including:
computer readable program code configured to, when the user desires to repurchase the merchandise, include the discount coupon in a request to repurchase the merchandise, the discount coupon including the encrypted user/purchase information section of the discount coupon and the decrypted description of the discount section of the discount coupon;
computer readable program code configured to create a user/repurchase information section of the request to repurchase;
computer readable program code configured to encrypt the discount coupon in the request to repurchase; and
computer readable program code configured to encrypt the encrypted discount coupon in the request to repurchase and the user/repurchase information section of the request to repurchase.

18. The computer program product of claim 17, further including:
computer readable program code configured to decrypt the request to repurchase;
computer readable program code configured to decrypt the discount coupon in the request to repurchase;
computer readable program code configured to decrypt the user/purchase information section of the discount coupon; and
computer readable program code configured to verify information in the user/purchase information section of the discount coupon regarding the purchase of the merchandise and information in the user/repurchase information section of the request to repurchase regarding the repurchase of the merchandise.

19. The computer program product of claim 12,
wherein the computer readable program code configured to create the discount coupon includes:
computer readable program code configured to create a user/purchase information section of the discount coupon, and
computer readable program code configured to create a description of the discount section of the discount coupon; and
wherein the computer readable program code configured to encrypt the discount coupon includes:
computer readable program code configured to encrypt the user/purchase information section of the discount coupon using a vendor secret-key, and computer readable program code configured to encrypt the encrypted user/purchase information section of the discount coupon and the description of the discount section of the discount coupon using a user public-key.

20. The computer program product of claim 19, further including:
computer readable program code configured to decrypt the discount coupon using a user private-key so that the discount coupon includes the encrypted user/purchase information section of the discount coupon and the decrypted description of the discount section of the discount coupon.

21. The computer program product of claim 20, further including:
computer readable program code configured to, when the user desires to repurchase the merchandise, include the discount coupon in a request to repurchase the merchandise, the discount coupon including the encrypted user/purchase information section of the discount coupon and the decrypted description of the discount section of the discount coupon;
computer readable program code configured to create a user/repurchase information section of the request to repurchase;
computer readable program code configured to encrypt the discount coupon in the request to repurchase using the user private-key; and
computer readable program code configured to encrypt the encrypted discount coupon in the request to repurchase and the user/repurchase information section of the request to repurchase using a vendor public-key.

22. The computer program product of claim 21, further including:
computer readable program code configured to decrypt the request to repurchase using a vendor private-key;
computer readable program code configured to decrypt the discount coupon in the request to repurchase using the user public-key;
computer readable program code configured to decrypt the user/purchase information section of the discount coupon using the vendor secret-key; and
computer readable program code configured to verify information in the user/purchase information section of the discount coupon regarding the purchase of the merchandise and information in the user/repurchase information section of the request to repurchase regarding the repurchase of the merchandise.

23. A system for regulating discounts on merchandise distributed through networked computer systems, the system comprising:
a vendor computer system connected to a network, said vendor computer system including:
a vendor computer configured to control the operation of said vendor computer system;
a vendor secondary storage device connected to said vendor computer; and
a vendor discount regulator configured to:
when a user purchases merchandise, create a discount coupon valid toward the repurchase of the merchandise, the discount coupon including information regarding the user and the purchase of the merchandise, and
encrypt the discount coupon,
said vendor discount regulator being stored in said vendor secondary storage device and executed by said vendor computer.

24. The system of claim 23, further including:
a user computer system connected to said network, said user computer system including:
a user computer configured to control the operation of said user computer system;
a user secondary storage device connected to said user computer; and
a user discount regulator configured to:
when the user desires to repurchase the merchandise, create a request to repurchase the merchandise, the request to repurchase including the encrypted discount coupon and information regarding the user and the repurchase of the merchandise,
said user discount regulator being stored in said user secondary storage device and executed by said user computer.

25. The system of claim 24, wherein said vendor discount regulator is further configured to:
decrypt the discount coupon in the request to repurchase; and
verify information regarding the purchase and the repurchase of the merchandise.

26. The system of claim 23, wherein said vendor discount regulator is further configured to:
create a user/purchase information section of the discount coupon;
create a description of the discount section of the discount coupon;
encrypt the user/purchase information section of the discount coupon; and
encrypt the encrypted user/purchase information section of the discount coupon and the description of the discount section of the discount coupon.

27. The system of claim 26, wherein said user discount regulator is further configured to:
decrypt the discount coupon so that the discount coupon includes the encrypted user/purchase information section of the discount coupon and the decrypted description of the discount section of the discount coupon.

28. The system of claim 27, wherein said user discount regulator is further configured to:
when the user desires to repurchase the merchandise, include the discount coupon in a request to repurchase the merchandise, the discount coupon including the encrypted user/purchase information section of the discount coupon and the decrypted description of the discount section of the discount coupon;
create a user/repurchase information section of the request to repurchase;
encrypt the discount coupon in the request to repurchase; and
encrypt the encrypted discount coupon in the request to repurchase and the user/repurchase information section of the request to repurchase.

29. The system of claim 28, wherein said vendor discount regulator is further configured to:
decrypt the request to repurchase;
decrypt the discount coupon in the request to repurchase;
decrypt the user/purchase information section of the discount coupon; and
verify information in the user/purchase information section of the discount coupon regarding the purchase of the merchandise and information in the user/repurchase information section of the request to repurchase regarding the repurchase of the merchandise.

* * * * *